US006343098B1

(12) United States Patent
Boyce

(10) Patent No.: US 6,343,098 B1
(45) Date of Patent: Jan. 29, 2002

(54) EFFICIENT RATE CONTROL FOR MULTI-RESOLUTION VIDEO ENCODING

(75) Inventor: Jill MacDonald Boyce, Manalapan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/031,035

(22) Filed: Feb. 26, 1998

(51) Int. Cl.[7] .................................................. H04B 1/66
(52) U.S. Cl. .................................................. 375/240.03
(58) Field of Search ........................... 375/240, 240.01, 375/240.02, 240.03, 240.04, 240.05, 240.06, 240.07, 240.18, 240.21; 348/384.1, 390.1, 404.1

(56) References Cited

U.S. PATENT DOCUMENTS

| 5,414,469 A | * | 5/1995 | Gonzales | ................ 375/240.18 |
| 5,703,646 A | * | 12/1997 | Oda | ............................ 348/401 |
| 6,005,621 A | * | 12/1999 | Linzer | ......................... 348/398 |

OTHER PUBLICATIONS

A. Puri and R. Aravind, "Motion–Compensated Video Coding with Adaptive Perceptual Quantization," IEEE Transactions on Circuits and Systems for Video Technology, vol. 1, No. 4, pp. 351–361, Dec. 1991.

W. Ding and B. Liu, "Rate Control of MPEG Video Coding and Recording by Rate–Quantization Modeling," *IEEE Transactions on Circuits and Systems for Video Technology*, vol. 6, No. 1, pp. 12–20, Feb. 1996.

J. Chalidabhongse and C.–C.J. Kuo, "Fast Motion Vector Estimation Using Multiresolution–Spatio–Temporal Correlations," IEEE Transactions on Circuits and Systems for Video Technology, vol. 7, No. 3, pp. 477–488, Jun. 1997.

* cited by examiner

*Primary Examiner*—Chris Kelley
*Assistant Examiner*—Gims Philippe
(74) *Attorney, Agent, or Firm*—Ryan, Mason & Lewis, LLP

(57) ABSTRACT

The invention provides a multi-resolution video encoding system which improves the computational efficiency associated with encoding a video sequence in two or more different resolutions. An illustrative embodiment includes a first encoder for encoding the sequence at a first resolution, and a second encoder for encoding the sequence at a second resolution higher than the first resolution. Information obtained from encoding the sequence at the first resolution is used to provide rate control for the sequence at the second resolution. This information may include, for example, a relationship between a quantization parameter selected for an image at the first resolution and a resultant output bitrate generated by encoding the image using the selected quantization parameter. The invention can be used with a variety of video encoding standards, including H.261, H.263, Motion-JPEG, MPEG-1 and MPEG-2.

30 Claims, 4 Drawing Sheets

EFFICIENT RATE CONTROL FOR MULTI-RESOLUTION VIDEO ENCODING

FIELD OF THE INVENTION

The invention relates generally to video encoding which utilizes motion-compensated video compression techniques, and more particularly to rate control in multi-resolution video encoding applications.

BACKGROUND OF THE INVENTION

Motion video sequences typically contain a significant amount of intra-frame or "spatial" redundancy as well as inter-frame or "temporal" redundancy. Video compression techniques take advantage of this spatial and temporal redundancy to significantly reduce the amount of information bandwidth required to transmit, store and process video sequences. Existing standards for digital video compression include, for example, H.261, H.263, Motion-JPEG, MPEG-1 and MPEG-2. Transmission of compressed digital video can take place over many types of transmission facilities, and with many available bandwidths. For example, in a multipoint transmission application, two or more receivers of a compressed video bitstream may each have different available bandwidths with which to receive the video data. It is generally desirable in such an application to allow a receiver with a high bandwidth to receive higher resolution video than a receiver with a low bandwidth, rather than limiting all of the receivers to the low bandwidth. In these and other similar applications, a given video sequence is encoded at multiple resolutions.

The MPEG-2 standard implements multi-resolution video encoding through a process known as spatial scalability. This involves encoding a base layer of the video at a lower resolution and one or more enhancement layers at higher resolutions. The base layer is then transmitted to all receivers in a multipoint transmission application, and the enhancement layer or layers are transmitted only to the higher bandwidth receivers. However, MPEG-2 spatial scalability requires the higher bandwidth receiver to decode two or more layers, which increases the computational complexity of the decoding process. In addition, the bandwidth required for transmitting two or more layers is generally higher than that required for transmitting a single bitstream encoded at the higher resolution. Additional detail regarding these and other aspects of the MPEG-2 standard are described in greater detail in "Information Technology Generic Coding of Moving Pictures and Associated Audio Information: Video," ISO/IEC DIS 13818-2, which is incorporated herein by reference.

FIG. 1 shows a conventional multi-resolution encoding system 10. A video sequence in Common Intermediate Format (CIF) is supplied directly to a first standard video encoder 12 and also to a downsampler 14. The first standard video encoder 12 encodes the CIF video sequence to generate a CIF bitstream. The downsampler 14 converts the CIF video sequence to a Quarter-CIF (QCIF) video sequence. A second standard video encoder 16 encodes the QCIF video sequence to generate a QCIF bitstream. The two encoders 12, 16 operate substantially independently, and generally do not share rate control information.

FIG. 2 shows one of the standard video encoders 12, 16 of FIG. 1 in greater detail. The CIF or QCIF video sequence is applied via a signal combiner 20 to a discrete cosine transform (DCT) generator 22 which generates DCT coefficients for macroblocks of frames in the sequence. These coefficients are applied to a quantizer 24, and the resulting quantized coefficients may be zig-zag scanned and run-amplitude coded before being applied to a variable-length coder (VLC) 26. The output of the VLC 26 is an encoded bitstream. Rate control is provided by a rate control processor 28. The DCT, quantization and variable-length coding operations of FIG. 2 are designed to remove spatial redundancy within a given video frame in the sequence.

Temporal or inter-frame redundancy is removed in the encoder of FIG. 2 through a process of inter-frame motion estimation and predictive coding. For example, MPEG-2 video frames may be either intra-coded (I) frames, forward-only predictive (P) frames or bidirectionally-predictive (B) frames. An I frame is encoded using only the spatial compression techniques noted above, while a P frame is encoded using "predictive" macroblocks selected from a single reference frame. A given B frame is encoded using "bidirectionally-predictive" macroblocks generated by interpolating between a pair of predictive macroblocks selected from two reference frames, one preceding and the other following the B frame. In the encoder of FIG. 2, the output of the quantizer 24 is applied to an inverse quantizer 30 and then to an inverse DCT generator 32. The output of the inverse DCT generator 32 is processed over one or more frames by a motion compensator 34 and motion estimator 36. The motion compensator 34 generates motion vectors which are combined with a subsequent frame in signal combiner 20 so as to reduce inter-frame redundancy and facilitate encoding.

A conventional video encoder such as that shown in FIG. 2 generally attempts to match the bitrate of the compressed video stream to a desired transmission bandwidth. The quantization parameter (QP) used in the quantizer 24 generally has a substantial effect on the resultant bitrate: a large QP performs coarse quantization, reducing the bitrate and the resulting video quality, while a small QP performs finer quantization, which leads to a higher bitrate and higher resulting image quality. The rate control processor 28 thus attempts to find a QP that is high enough to restrain the bitrate, but with the best possible resulting image quality. In general, it is desirable to maintain consistent image quality throughout a video sequence, rather than having the image quality vary widely from frame to frame. Both the MPEG-2 simulation model and the H.263 test model suggest rate control techniques for selecting the QP.

Approaches for implementing this type of rate control are described in greater detail in, for example, A. Puri and R. Aravind, "Motion-Compensated Video Coding with Adaptive Perceptual Quantization," IEEE Transactions on Circuits and Systems for Video Technology, Vol. 1, No. 4, pp. 351–361, December 1991, and W. Ding and B. Liu, "Rate Control of MPEG Video Coding and Recording by Rate-Quantization Modeling," IEEE Transactions on Circuits and Systems for Video Technology, Vol. 6, No. 1, pp. 12–20, February 1996, both of which are incorporated by reference herein. These approaches generally first select a target bitrate for each frame type (i.e., I frames, P frames and B frames), and the encoder attempts to assign the same number of bits to each frame of the same type. A frame-wide QP is then determined for each frame in an attempt to match the target bitrate for that frame. The approach described in the Puri and Aravind reference determines the frame-wide QP by using an activity measure, the frame variance. The approach described in the Ding and Liu reference generates a rate-quantization model. In either approach, the encoder may also vary the QP for individual macroblocks based on local activity measures.

A significant problem with these and other conventional rate control techniques is that they can be computation intensive, particularly for high resolution video sequences. For example, the approach in the Ding and Liu reference performs multi-pass encoding, that is, an entire frame is encoded more than one time using different QPs in order to find a QP that results in an actual bitrate closer to the target bitrate. This type of multi-pass encoding can be very computation intensive, and substantially reduces the efficiency of the encoding process.

SUMMARY OF THE INVENTION

The invention provides a multi-resolution video encoding system which improves the computational efficiency associated with encoding a video sequence in two or more different resolutions. An illustrative embodiment includes a first encoder for encoding the sequence at a first resolution, and a second encoder for encoding the sequence at a second resolution, where the second resolution is higher than the first resolution. Information obtained from encoding the sequence at the first resolution is used to provide rate control for the sequence at the second resolution. This information may include, for example, a relationship between a quantization parameter selected for an image at the first resolution and an actual output bitrate generated by encoding the image using the selected quantization parameter.

An exemplary rate control process implemented in the above-described illustrative embodiment may first determine target bitrates for different types of images at each of the first and second resolutions. The target bitrates may be set independently for each of the first and second resolutions, or alternatively maintained in a fixed ratio. The process then utilizes a rate-quantization model to select a quantization parameter for use with a given one of the images of the sequence at the first resolution. The selected quantization parameter is the quantization parameter which best matches the target bitrate for the first resolution. An estimated bitrate is determined for the image at the first resolution to be encoded using the selected quantization parameter, by dividing the target bit rate for the second resolution by a factor. The rate-quantization model is then used to determine a quantization parameter for an image at the second resolution, by finding the best quantization parameter for encoding the image at the first resolution to achieve the estimated number of bits for the image. The above-noted factor may be updated as the sequence is encoded by, for example, recomputing it as a moving average of the ratio between: (1) an actual number of bits used when encoding the image at the second resolution using the determined quantization parameter, and (2) the number of bits which the rate-quantization model estimates will be required for encoding the image at the second resolution.

The invention improves the computational efficiency of multi-resolution video encoding by using information generated during the encoding of lower resolution images to facilitate the encoding of higher resolution images. Unlike the conventional spatial scalability approach described previously, the invention can allow each receiver in a multipoint transmission application to choose its own single-resolution video stream, such that each receiver makes the most efficient use of its own available bandwidth. The invention can be used with a variety of video encoding standards, including H.261, H.263, Motion-JPEG, MPEG-1 and MPEG-2. These and other features and advantages of the present invention will become more apparent from the accompanying drawings and the following detailed description.

DETAILED DESCRIPTION OF THE INVENTION

The following description will illustrate the invention using an exemplary two-resolution video encoding system. It should be understood, however, that the invention is not limited to use with any particular type of video signal format, video encoding standard or encoding system configuration. The invention is instead more generally applicable to any video encoding system in which it is desirable to improve the efficiency of an encoding process for generating encoded bitstreams in two or more resolutions. The term "video sequence" should be understood to include any frame or field sequence which is in a form suitable for encoding in accordance with standards such as, for example, H.261, H.263, Motion-JPEG, MPEG-1 and MPEG-2. The term "image" as used herein refers to a frame or field of a video sequence. The term "block" as used herein is intended to include not only macroblocks as defined in the above-noted compression standards, but more generally any grouping of pixel elements in a video frame or field.

The invention improves the computational efficiency of multi-resolution video encoding by using information generated during the encoding of lower resolution images to facilitate the encoding of higher resolution images. Unlike the conventional spatial scalability approach described previously, the invention can, for example, allow each receiver in a multipoint transmission application to choose its own single-resolution video stream. This is generally a bandwidth-efficient solution in that each receiver makes the most efficient use of its own available bandwidth. To implement this aspect of the invention, a multi-resolution encoding system encodes two or more independent bitstreams, with differing levels of bitrate and resolution. Although the resulting bitstreams can be decoded independently of one another, they are generated by encoding different resolution versions of the same video sequence.

Figure 1:
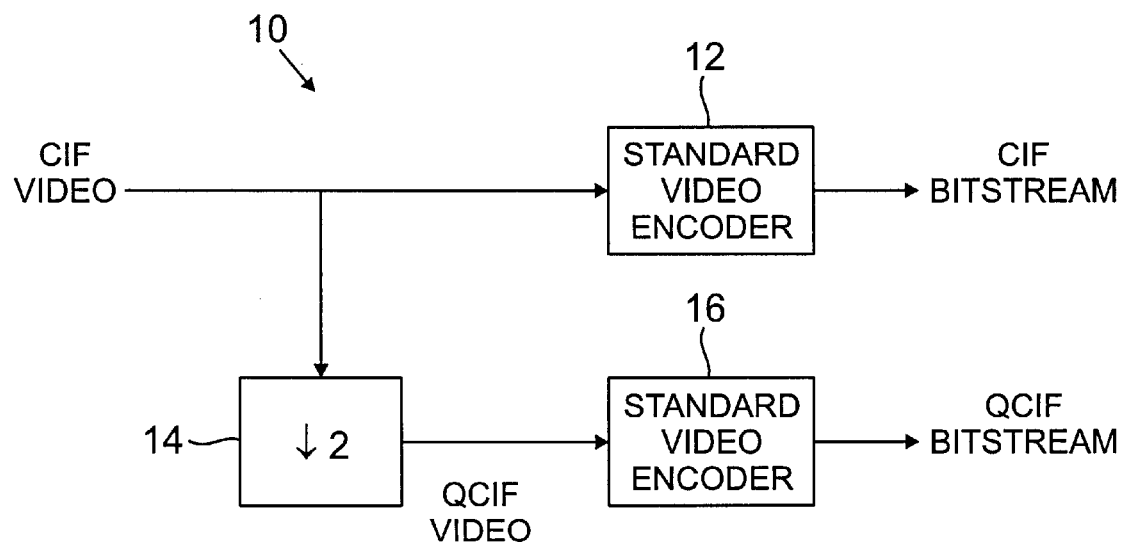
FIG. 1 is a block diagram of a conventional multi-resolution video encoding system.
Figure 3:
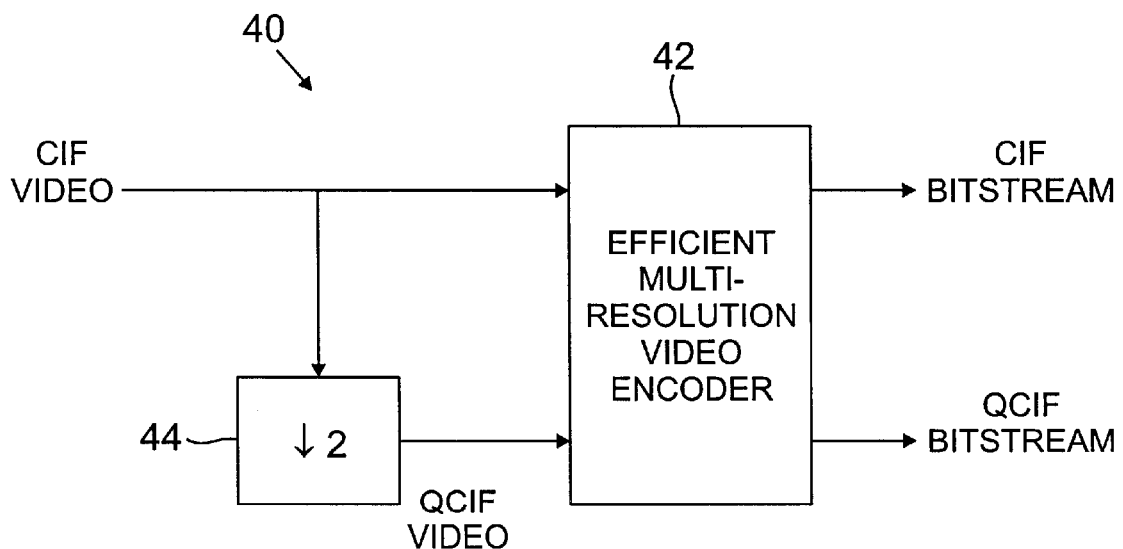
FIG. 3 is a block diagram of a multi-resolution video encoding system in accordance with an exemplary embodiment of the invention.
Figure 2:
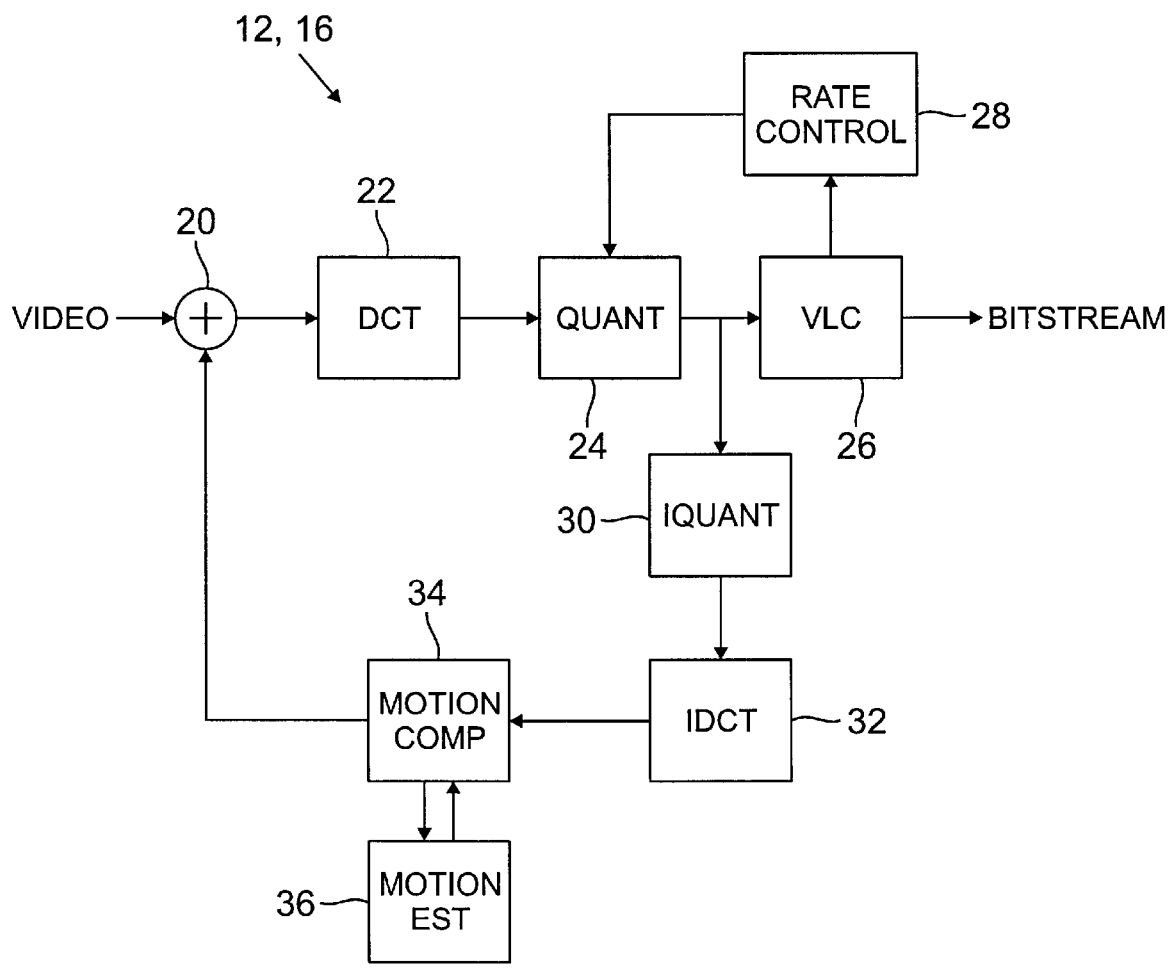
FIG. 2 is a block diagram of one of the standard video encoders in the conventional multiresolution video encoding system of FIG. 1.

FIG. 3 shows a multi-resolution video encoding system 40 in accordance with an illustrative embodiment of the invention. The encoding system 40 in this embodiment utilizes the H.263 video encoding standard, and the system provides output bitstreams at two different resolutions: CIF and QCIF. As previously noted, the techniques to be described are applicable to other video encoding standards, and to any number of different resolutions greater than or equal to two. The system 40 includes an efficient multi-resolution video encoder 42 and a downsampler 44. An input CIF video frame sequence is applied directly to an input of the multi-resolution encoder 42 and also to an input of the downsampler 44. The downsampler 44 converts the CIF video frame sequence to a QCIF video frame sequence. The QCIF video sequence is applied to another input of the multi-resolution encoder 42.

The CIF video sequence in system 40 may be any sequence of progressive or interlaced frames suitable for encoding in accordance with a video compression technique such as H.263. A progressive frame sequence generally has a frame rate of 30 frames per second with a single field in each frame, while an interlaced frame sequence generally includes two fields in each frame and therefore will include 60 fields per second at a 30 frame per second frame rate. The two fields in each frame of the interlaced sequence include an even field corresponding to even scan lines and an odd field corresponding to odd scan lines. The video sequence may be supplied from a video source such as a video camera, a telecine source, a video receiver, a digital video disc (DVD) drive, a video cassette recorder, other types of magnetic or optical drives, and the like. A given video frame is divided into a plurality of macroblocks, with each macroblock including four 8×8 blocks of luminance samples and either two or four 8×8 blocks of chroma samples.

The video frame sequence suitable for encoding may be generated from an NTSC or PAL analog video signal. NTSC video signals utilize 525 scan lines per frame and a frame rate of 30 frames per second, while PAL video signals utilize 625 scan lines per frame and a frame rate of 25 frames per second. The above-noted video source may generate an analog NTSC or PAL video signal which is converted in a well-known manner to a video sequence in the CIF format. In applications in which the video sequence is generated from film, the sequence may include telecine material generated using a 3:2 pulldown technique. A 3:2 pulldown technique converts film having a frame rate of 24 frames per second into a 60 field per second digital video sequence.

Figure 4:
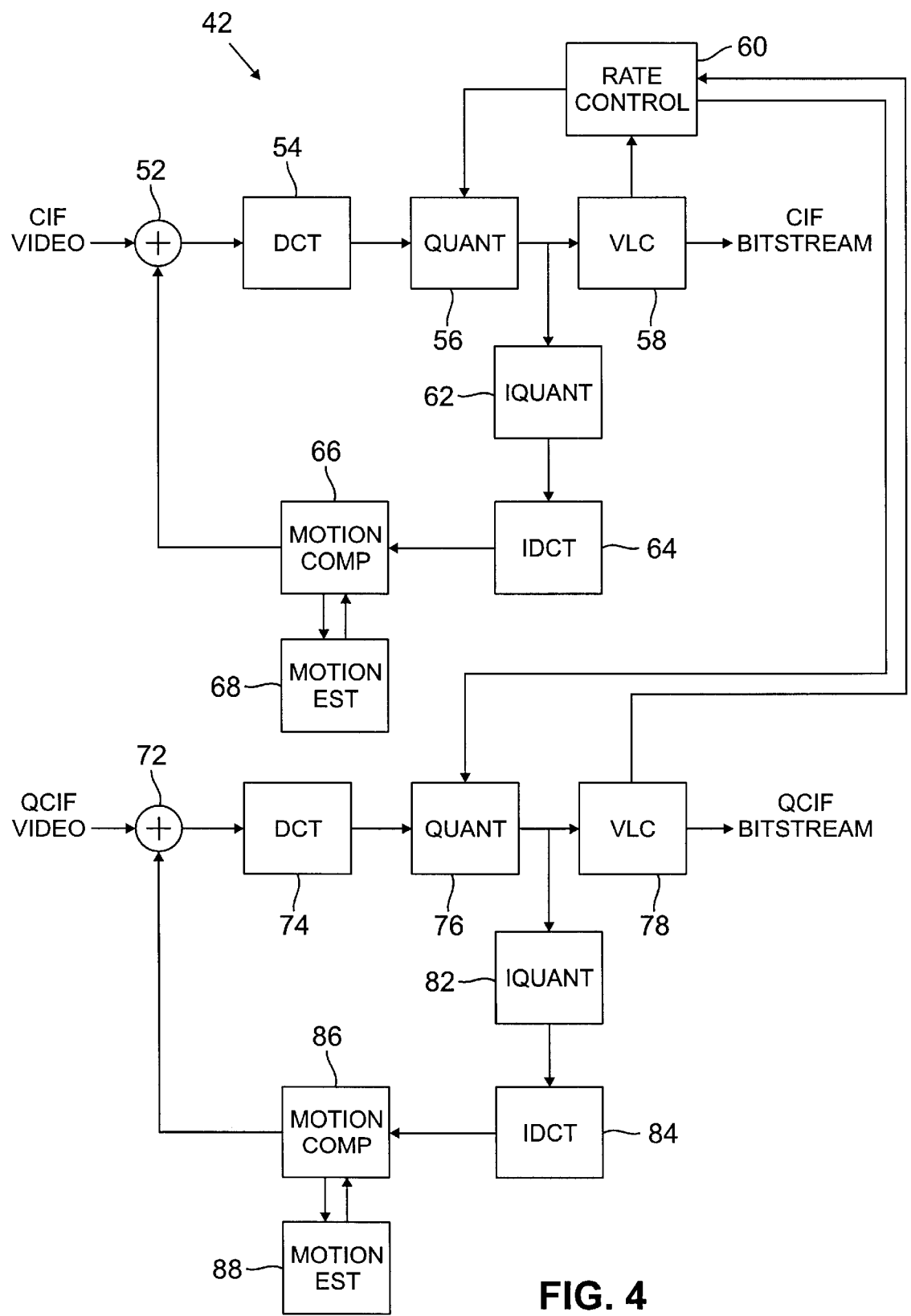
FIG. 4 is a block diagram of a multi-resolution video encoder suitable for use in the encoding system of FIG. 3.

FIG. 4 shows an illustrative embodiment of the multi-resolution video encoder 42. The CIF video sequence is applied via a signal combiner 52 to a discrete cosine transform (DCT) generator 54 which generates DCT coefficients for macroblocks in frames of the CIF frame sequence. These coefficients are applied to a quantizer 56, and the resulting quantized coefficients are applied to a variable-length coder (VLC) 58. In other embodiments, additional processing operations, such as zig-zag scanning and run-amplitude coding, may be performed on the quantized coefficients prior to variable-length coding. The output of the VLC 58 is an encoded CIF bitstream. Rate control is provided, in a manner to be described in detail below, by a rate control processor 60. The output of rate control processor 60 is coupled to an input of the quantizer 56. The output of the quantizer 56 is applied to an inverse quantizer 62 and then to an inverse DCT generator 64. A motion compensator 66 and motion estimator 68 process the output of inverse DCT generator 64 over multiple frames. The motion compensator 66 generates motion vectors which are combined with a subsequent CIF frame in signal combiner 52 so as to reduce inter-frame redundancy and facilitate encoding of the CIF frame sequence.

The QCIF video sequence from the downsampler 44 is applied via a signal combiner 72 to a DCT generator 74 which generates DCT coefficients for macroblocks in frames of the QCIF frame sequence. These coefficients are applied to a quantizer 76, and the resulting quantized coefficients are applied to a VLC 78. As in the CIF encoding described above, alternative embodiments may perform additional processing operations, such as zig-zag scanning and run-amplitude coding of the quantized coefficients, prior to variable-length coding. The output of the VLC 78 is an encoded QCIF bitstream. Rate control for the QCIF encoding is also provided by the rate control processor 60, as will be described in greater detail below in conjunction with the flow diagram of FIG. 5. An output of VLC 78 is coupled to an input of the rate control processor 60, and an output of the rate control processor 60 is coupled to an input of the quantizer 76. The output of the quantizer 76 is also applied to an inverse quantizer 82 and then to an inverse DCT generator 84. The output of the inverse DCT generator 84 is processed over multiple frames by a motion compensator 86 and motion estimator 88. The motion compensator 86 generates motion vectors which are combined with a subsequent QCIF frame in signal combiner 72 so as to reduce inter-frame redundancy and facilitate encoding of the QCIF frame sequence.

The operation of the rate control processor 60 of FIG. 4 will now be described in greater detail. The invention in this illustrative embodiment efficiently determines a frame-wide quantization parameter (QP) for a given frame that will approximately match a target bitrate for the given frame when that frame is encoded. It makes use of the fact that multiple resolutions of the same video sequence are being encoding simultaneously in the system 40. More particularly, information acquired by performing the QCIF encoding, such as the relationship between the quantization parameter and the resultant bitrate, is used to perform the CIF encoding. There is a strong correlation between the number of bits required to encode a CIF image at a given quantization parameter with the number of bits required to encode the corresponding QCIF image at the same quantization parameter. Experiments have shown that the relationship is approximately linear for several different types of common video sequences. The relationship may be expressed as:

$$BITS_{CIF} \approx BITS_{QCIF} * FACTOR,$$

where $BITS_{CIF}$ is the number of bits required to encode a CIF frame at a given QP, $BITS_{QCIF}$ is the number of bits required to encode the corresponding QCIF frame at the given QP, and FACTOR is a number which varies slightly for different types of video sequences, but generally does not vary greatly for different frames of the same sequence. FACTOR tends to be in the range of about 2.5 to 3 for CIF and QCIF images encoded using H.263 compression.

Figure 5:
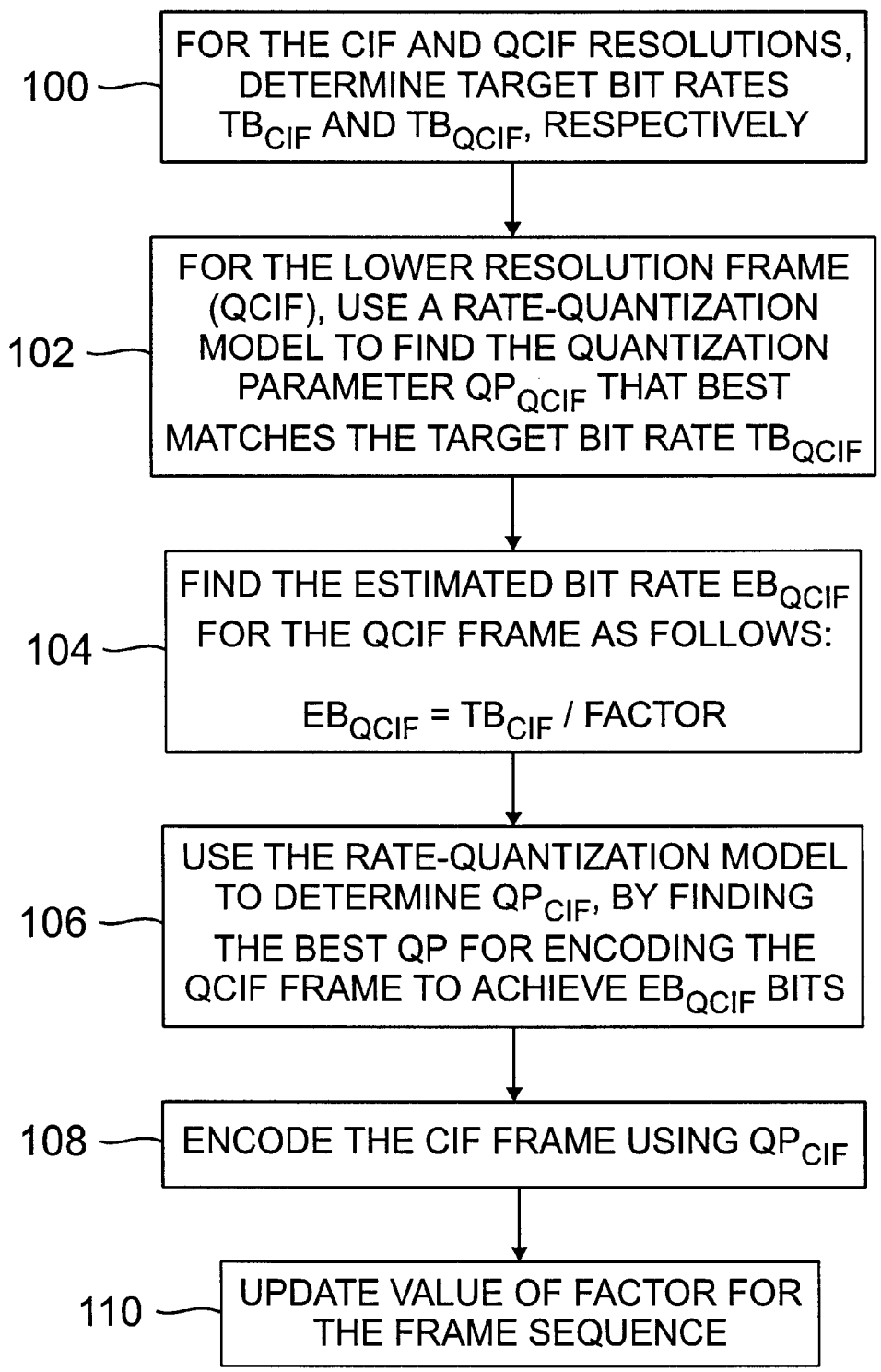
FIG. 5 is a flow diagram illustrating a rate control process which may be implemented in the multi-resolution video encoder of FIG. 4.

FIG. 5 is a flow diagram illustrating the rate control process implemented in the rate control processor 60. In step 100, target bitrates $TB_{CIF}$ and $TB_{QCIF}$ are determined for each type of frame in the CIF and QCIF resolutions, respectively. These target bitrates may be determined, for example, in the manner described in A. Puri and R. Aravind, "Motion-Compensated Video Coding with Adaptive Perceptual Quantization," IEEE Transactions on Circuits and Systems for Video Technology, Vol. 1, No. 4, pp. 351–361, December 1991, and W. Ding and B. Liu, "Rate Control of MPEG Video Coding and Recording by Rate-Quantization Modeling," IEEE Transactions on Circuits and Systems for Video Technology, Vol. 6, No. 1, pp. 12–20, February 1996. Other suitable techniques could also be used. In step 102, a rate-quantization model such as that described in the Ding and Liu reference is used to find a quantization parameter $QP_{QCIF}$ for use with a given one of the lower resolution QCIF frames. This quantization parameter $QP_{QCIF}$ should be the one which best matches the QCIF target bitrate $TB_{QCIF}$. In step 104, an estimated bitrate $EB_{QCIF}$ is determined for the QCIF frame to be encoded using $QP_{QCIF}$, based on the following equation:

$$EB_{QCIF} = TB_{CIF}/FACTOR,$$

where FACTOR is defined in the manner previously described. The rate-quantization model is then used in step 106 to determine $QP_{CIF}$. This involves finding the best QP for encoding the QCIF frame to achieve $EB_{QCIF}$ bits for the frame. The resulting $QP_{CIF}$ is then used to encode the corresponding CIF frame in step 108. The value of FACTOR is updated in step 110. This update may involve, for example, recomputing FACTOR as a moving average of the ratio between: (1) the actual number of bits used when encoding the CIF frame using the quantization parameter $QP_{CIF}$ in step 108, and (2) the number of bits which the rate-quantization model estimates will be required for encoding the QCIF frame using the same quantization parameter $QP_{CIF}$.

The above-described rate control process provides substantially improved computational efficiency in encoding a CIF frame, relative to direct application of the rate-quantization model to the CIF frame as in conventional techniques. Forming the rate-quantization model generally requires two passes of quantization and variable length coding for a given frame. It is substantially less computationally expensive to perform these two passes only on a QCIF frame, as in the illustrative process of FIG. 5, rather than performing two passes on both a QCIF frame and the corresponding CIF frame as in conventional techniques. This is because the QCIF frame has one-fourth the resolution of the corresponding CIF frame, and therefore requires only about one-fourth the number of computations. The rate control process illustrated in FIG. 5 also provides the advantage of allowing target bitrates to be set individually for both the CIF and the QCIF frame sequences, rather than requiring them to have a fixed ratio.

It should be noted that the elements of the system 40 may be implemented using a central processing unit, microprocessor, application-specific integrated circuit or other data processing device in a computer, video transmitter, cable system headend, television set-top box or other type of video signal processor. The invention may be utilized in conjunction with numerous types of video processing or transmission systems, including global computer networks such as the Internet, wide area networks, local area networks, cable systems, satellite systems and standard wired telephone networks. For example, the invention is suitable for use in systems such as switched digital video (SDV), hybrid fiber/coax (HFC), direct broadcast satellite (DBS), multichannel multipoint distribution service (MMDS) and digital subscriber loop (DSL).

The above-described embodiments of the invention are intended to be illustrative only. For example, a possible alternative embodiment of the FIG. 5 rate control process could utilize a fixed ratio between target bitrates for the different resolution sequences. In such an embodiment, another technique, such as that described in the above-cited Puri and Aravind reference, may be used in place of a rate-quantization model to determine the quantization parameter for a lower resolution frame sequence. Other possible alternative embodiments could utilize different types of information from an encoding at a first resolution, to provide rate control at a second resolution. The information may be obtained when encoding of a designated portion of a sequence at the first resolution is complete, or while the encoding of the designated portion of the sequence is still in progress. These and numerous other alternative embodiments within the scope of the following claims will be apparent to those skilled in the art.

What is claimed is:

1. A method of encoding a video sequence including a sequence of images, the method comprising the steps of:
    encoding the video sequence at a first resolution; and
    utilizing information from the encoding at the first resolution to provide rate control for the sequence at a second resolution higher than the first resolution;
    wherein target bit rates are determined for each of the first and second resolutions, a first quantization parameter is selected for encoding at the first resolution based on the target bit rate for the first resolution, an estimated bit rate is determined for encoding at the first resolution using the first quantization parameter based on the target bit rate for the second resolution, and a second quantization parameter is selected for encoding at the second resolution based on the estimated bit rate for encoding at the first resolution.

2. The method of claim 1 wherein the first resolution is a QCIF resolution and the second resolution is a CIF resolution.

3. The method of claim 1 wherein the utilizing step includes utilizing information from the encoding at the first resolution to provide rate control for the sequence at two or more additional resolutions.

4. The method of claim 1 wherein the information from the encoding at the first resolution that is utilized to provide rate control for the sequence at a second resolution includes a relationship between a quantization parameter selected for an image at the first resolution and a resultant output bitrate generated by encoding the image using the selected quantization parameter.

5. The method of claim 1 wherein the encoding step for the sequence at the first resolution includes the step of determining an image-wide quantization parameter for a given image at the first resolution that will approximately match a target bitrate for the given image when that image is encoded using the quantization parameter.

6. The method of claim 1 wherein the encoding step includes the step of determining target bitrates for different types of images at each of the first and second resolutions.

7. The method of claim 6 wherein the target bit rates are set independently for each of the first and second resolutions.

8. The method of claim 6 wherein the target bit rates of the first and second resolutions are maintained in a fixed ratio.

9. The method of claim 1 wherein the encoding step further includes utilizing a rate-quantization model to select a quantization parameter for use with a given one of the images of the sequence at the first resolution.

10. The method of claim 9 wherein the selected quantization parameter is the quantization parameter which best matches a target bitrate for the first resolution.

11. The method of claim 9 wherein an estimated bitrate is determined for the image at the first resolution to be encoded using the selected quantization parameter, by dividing a target bit rate for an image at the second resolution by a factor.

12. The method of claim 9 wherein the rate-quantization model is used to determine a quantization parameter for an image at the second resolution, by finding the best quantization parameter for encoding the image at the first resolution to achieve an estimated number of bits for the image.

13. The method of claim 11 further including the step of updating the factor by recomputing it as a moving average of the ratio between (1) an actual number of bits used when encoding the image at the second resolution using the quantization parameter for the image at the second resolution, and (2) the number of bits which a rate-quantization model estimates will be required for encoding the image at the second resolution using the same quantization parameter.

14. An apparatus for encoding a video sequence including a sequence of images, the apparatus comprising:
    a first encoder for encoding the video sequence at a first resolution; and a second encoder for encoding the video sequence at a second resolution higher than the first resolution, the second encoder having an input coupled to an output of the first encoder, such that information generated while encoding the video sequence at the first resolution is used to provide rate control for the sequence at the second resolutions;

wherein target bit rates are determined for each of the first and second resolutions, a first quantization parameter is selected for encoding at the first resolution based on the target bit rate for the first resolution, an estimated bit rate is determined for encoding at the first resolution using the first quantization parameter based on the target bit rate for the second resolution, and a second quantization parameter is selected for encoding at the second resolution based on the estimated bit rate for encoding at the first resolution.

15. The apparatus of claim 14 wherein the first resolution is a QCIF resolution and the second resolution is a CIF resolution.

16. The apparatus of claim 14 further including at least one additional encoder for encoding the sequence at one or more other resolutions, wherein the information from the encoding at the first resolution is utilized to provide rate control for the sequence at the other resolutions.

17. The apparatus of claim 14 wherein the information from the encoding at the first resolution that is utilized to provide rate control for the sequence at a second resolution includes a relationship between a quantization parameter selected for an image at the first resolution and a resultant output bitrate generated by encoding the image using the selected quantization parameter.

18. The apparatus of claim 14 further including a rate control processor associated with at least one of the first and second encoders, wherein the processor is operative to determine an image-wide quantization parameter for a given image at the first resolution that will approximately match a target bitrate for the given image when that image is encoded using the quantization parameter.

19. The apparatus of claim 18 wherein the processor is operative to determine target bitrates for different types of images at each of the first and second resolutions.

20. The apparatus of claim 19 wherein the target bit rates are set independently for each of the first and second resolutions.

21. The apparatus of claim 19 wherein the target bit rates of the first and second resolutions are maintained in a fixed ratio.

22. The apparatus of claim 18 wherein the processor utilizes a rate-quantization model to select a quantization parameter for use with a given one of the images of the sequence at the first resolution.

23. The apparatus of claim 22 wherein the selected quantization parameter is the quantization parameter which best matches a target bitrate for the first resolution.

24. The apparatus of claim 18 wherein the processor is operative to determine an estimated bitrate for the image at the first resolution to be encoded using the selected quantization parameter, by dividing a target bit rate for an image at the second resolution by a factor.

25. The apparatus of claim 22 wherein the processor is operative to utilize the rate-quantization model to determine a quantization parameter for an image at the second resolution, by finding the best quantization parameter for encoding the image at the first resolution to achieve an estimated number of bits for the image.

26. The apparatus of claim 24 wherein the processor is operative to update the factor by recomputing it as a moving average of the ratio between (1) an actual number of bits used when encoding the image at the second resolution using the quantization parameter for the image at the second resolution, and (2) the number of bits which a rate-quantization model estimates will be required for encoding the image at the second resolution using the same quantization parameter.

27. An apparatus for encoding a video sequence including a sequence of images, the apparatus comprising:

means for encoding the video sequence at a first resolution; and means for providing rate control for the sequence at a second resolution higher than the first resolution utilizing information from the encoding at the first resolution;

wherein target bit rates are determined for each of the first and second resolutions, a first quantization parameter is selected for encoding at the first resolution based on the target bit rate for the first resolution, an estimated bit rate is determined for encoding at the first resolution using the first quantization parameter based on the target bit rate for the second resolution, and a second quantization parameter is selected for encoding at the second resolution based on the estimated bit rate for encoding at the first resolution.

28. An apparatus for encoding a video sequence including a sequence of images, the apparatus comprising:

at least one encoder for encoding the video sequence at a first resolution; and a rate control processor having an input coupled to an output of the at least one encoder, the rate control processor providing rate control for the sequence at an additional resolution higher than the first resolution using information obtained by the at least one encoder while encoding the sequence at the first resolution;

wherein target bit rates are determined for each of the first and second resolutions a first quantization parameter is selected for encoding at the first resolution based on the target bit rate for the first resolution an estimated bit rate is determined for encoding at the first resolution using the first quantization parameter based on the target bit rate for the second resolution, and a second quantization parameter is selected for encoding at the second resolution based on the estimated bit rate for encoding at the first resolution.

29. The apparatus of claim 28 wherein the processor is operative to provide the rate control for the sequence at the additional resolution using information obtained when encoding of a portion of the sequence at the first resolution is complete.

30. The apparatus of claim 28 wherein the processor is operative to provide the rate control for the sequence at the additional resolution using information obtained when encoding of a portion of the sequence at the first resolution is still in progress.

* * * * *